(12) United States Patent
Duenas (10) Patent No.: US 6,336,362 B1
(45) Date of Patent: Jan. 8, 2002

(54) METHOD AND SYSTEM FOR MEASURING AND REMOTELY REPORTING THE LIQUID LEVEL OF TANKS AND THE USAGE THEREOF

(76) Inventor: Roy A. Duenas, 4215 NW. 10th St., Gainesville, FL (US) 32609

( * ) Notice: Subject to any disclaimer, the term of this patent is extended or adjusted under 35 U.S.C. 154(b) by 0 days.

(21) Appl. No.: 09/235,247

(22) Filed: Jan. 22, 1999

Related U.S. Application Data (60) Provisional application No. 60/072,215, filed on Jan. 22, 1998.

(51) Int. Cl.$^7$ ................................................ G01F 23/36
(52) U.S. Cl. ....................................................... 73/313
(58) Field of Search ............................. 73/290 R, 305, 73/309, 313, 314, 317

(56) References Cited

U.S. PATENT DOCUMENTS

| | | |
|---|---|---|
| 3,258,968 A | 7/1966 | Woodcock |
| 3,486,479 A | 12/1969 | Hartmann |
| 3,824,587 A | 7/1974 | Fowler |
| 3,879,136 A | 4/1975 | Takeda |
| 4,004,097 A | 1/1977 | Spaulding |
| 4,102,394 A | 7/1978 | Botts |
| 4,375,592 A | 3/1983 | Cox et al. |
| 4,387,434 A | 6/1983 | Moncrief, Jr. et al. |
| 4,466,189 A | 8/1984 | Tobin, Jr. |
| 4,486,625 A | 12/1984 | Reinauer et al. |
| 4,501,963 A | 2/1985 | Perisic |
| 4,554,494 A | 11/1985 | Howeth |
| 4,571,995 A | 2/1986 | Timme |
| 4,594,675 A | 6/1986 | Yoshizawa |
| 4,716,534 A | 12/1987 | Baucom et al. |
| 4,788,648 A | 11/1988 | Ferretti et al. |
| 4,812,654 A | 3/1989 | Araujo |
| 4,845,486 A | 7/1989 | Knight et al. |
| 4,985,624 A | 1/1991 | Spillman, Jr. |
| 5,023,806 A | 6/1991 | Patel |
| 5,089,708 A | 2/1992 | Asselbergs |
| 5,111,201 A | 5/1992 | Matsummara et al. |
| 5,138,564 A | 8/1992 | de Jong et al. |
| 5,224,051 A | 6/1993 | Johnson |
| 5,265,032 A | 11/1993 | Patel |
| 5,305,639 A | 4/1994 | Pontefract |
| 5,319,964 A | * 6/1994 | Stephenson et al. .......... 73/149 |
| 5,357,815 A | 10/1994 | Williamson |
| 5,365,420 A | 11/1994 | Cadman |
| 5,406,269 A | 4/1995 | Baran |
| 5,416,725 A | 5/1995 | Pacheco et al. |
| 5,454,031 A | 9/1995 | Gray et al. |
| 5,483,831 A | * 1/1996 | Steiner ........................ 73/313 |
| 5,532,687 A | 7/1996 | Ricchardson et al. |
| 5,627,380 A | 5/1997 | Crowne |
| 5,642,097 A | 6/1997 | Martel |
| 5,655,403 A | * 8/1997 | Topliff ....................... 73/322.5 |
| 5,659,302 A | 8/1997 | Cordier |
| 5,950,487 A | * 9/1999 | Maresca, Jr. et al. ......... 73/293 |

* cited by examiner

*Primary Examiner*—Hezron Williams
*Assistant Examiner*—Charles D. Garber
(74) *Attorney, Agent, or Firm*—Saliwanchik, Lloyd & Saliwanchik (57) ABSTRACT

A system and a method for periodically detecting the level of liquid propane in industrial, commercial and residential tanks; and transmitting this information from a remote location to a host system located at a host facility or at the site of the propane supplier in order to, among other purposes, prevent out-of-gas situations to improve safety and minimize economic and civil liability; to optimize and schedule refill trips to the tank and increase customer service and satisfaction; to keep track of propane usage on a periodically or daily basis for billing purposes; to know when the tanks have been serviced or refilled for personnel control and anti-fraud purposes; to keep an inventory of available empty space in the tanks to optimize the purchasing and delivery of bulk propane through the future options market.

8 Claims, 11 Drawing Sheets

METHOD AND SYSTEM FOR MEASURING AND REMOTELY REPORTING THE LIQUID LEVEL OF TANKS AND THE USAGE THEREOF

This application claims benefit to Provisional Application 60/072,215 filed Jan. 22, 1998.

FIELD OF THE INVENTION

This invention relates to remote liquid level monitoring of propane storage tanks via the public telephone network or other means of telecommunications, like radio frequency; from a remotely located tank to a host computer located at the propane suppliers' site or to a computer at a centralized location. Such reporting from remote monitors is triggered by previously programmed expected events, or periodically programmed to occur in a timely manner.

BACKGROUND OF THE INVENTION

The quantity of liquid propane stored and remaining on customer propane tanks should be accurately and frequently measured by the propane dealer to maintain control of his customer's needs, his [dealer's] inventory, and control and schedule delivery of propane to his customers. Additionally, the dealer, being responsible for the safety of propane usage by his customers, needs to prevent, as much as possible, his customer from running out of gas. The standard practice for propane dealers to keep track of their customers' propane consumption is to, whether or not propane is needed, periodically visit each tank and visually read a gauge located on the tank. This industry practice results in a high operating costs and highly inefficient practices.

It is an industry standard that all propane gas suppliers dispatch several route-drivers every day to check the level of propane gas in their tanks for each route, replenishing the tanks should they be low and meet certain criteria. The criteria for refilling low tanks is determined by several factors, including customer's preference of maximum quantity of propane gas put in the tank each time it is refilled, in order to keep payments low. Also, seasonal changes require changing the frequency and quantities of propane dispensed to each customer. As a consequence, propane suppliers must meet numerous legal requirements and customer demands.

A number of tanks today are fitted with gauges for reading levels in a tank, as well known in the art. A common type of gage is the float gage which has a float that rests on the surface of the fluid being measured. The float is usually connected with other members which move with the float as the fluid level changes. Movement of the float and attached members is sensed by a gage, typically through a magnetic coupling, to provide on-site indication, either visual or otherwise, of the fluid level. A similar system is described in U.S. Pat. No. 5,357,815, incorporated herein by reference, which utilizes a float and a pointer assembly which pivots about an axis in response to the float's level in a tank to allow for on site inspection of the level in the tank. Other systems have been devised to remotely measure liquid levels in tanks, such as that described in U.S. Pat. No. 4,788,648, incorporated herein by reference, which utilizes differential pressure measurements to calculate the level. Another system is described in U.S. Pat. No. 5,111,201, incorporated herein by reference, which utilizes radio transmissions to transmit level information from a float attached to a potentiometer which varies voltage to correspond to liquid level in a tank. Other representative systems include those described in U.S. Pat. Nos. 5,023,806, 5,265,032, and 5,305,639 each of which is incorporated herein by reference.

Despite the existence of these systems, there is a need in the art for a system which is readily received by and/or retrofitted on to standard tanks which provides an accurate reading that can be transmitted to a host system to accurately monitor the level in a tank.

SUMMARY OF THE INVENTION

The present invention comprises a system, methods, and devices to efficiently and remotely monitor a physical condition such as a liquid level of a tank.

The subject system comprises a combination of various electronic modules and mechanical assemblies that interactively will: (1) periodically or continuously sense and monitor one or more physical conditions such as, but not limited to liquid or gas level in a tank, pressure, temperature, flow, displacement, orientation, light (color, intensity, direction), and sound; (2) based on the sensed physical condition, or upon the occurrence of an event, determine what actions to take based on an embedded set of instructions and threshold parameters; (3) transmit appropriate information from a remote site to a host system by one or more means of communications such as, but not limited to radio waves, telephone lines, cable TV circuits, electrical power grid, light signals, sonar signals through water mains, etc.; (4) analyze and make predictive projections based on the information sent and received.

The sensor unit, to sense the level of the liquid in the tank and report it, preferably includes an electronic circuit to decode specific markings on a disc. The disc is magnetically coupled to a master magnet connected to the float within the tank. The master magnet rotates as a function of the level of liquid in the tank. A slave magnet secured to the disc rotates in turn with the master magnet. The disc comprises specifically placed markings to be optically read by appropriate sensors. These markings are preferably located in concentric circles, or tracks, about the disc.

In one embodiment, a plurality of tracks are marked so that the sensors read a binary representation of the angular position of the disc. The marking can be accomplished with dark and light sections, reflective and non-reflective sections, and/or a cut-away section with or without a reflective surface underneath. These contrasting markings provide the binary representations of "on" and "off" or "0" and "1". The markings are preferably arranged such that the binary representations change as the disc rotates according to a Gray-coded scale. Gray-coding is also referred to as "cyclic binary code" or reflective code (i.e., a sequence of code values is employed around the disc such that transitions between each Gray-code representation of angular position is accomplished with only a single bit change between each angular position). A sample Gray-coded position indicator is described in U.S. Pat. No. 3,824,587, incorporated herein by reference. This type of coding is preferred for accuracy. For example, as light from a source reflects off a light section, such may represent "1", whereas when light is absorbed by a dark section, such may represent a "0". If, for example, four tracks are utilized to represent position, and the light sections radially overlap on adjacent ends about a 360° range (or somewhat less), the binary combinations representing position would include the binary combinations of 0000, 1000, 1100, 0100, 0110, 0011, and 0001. More tracks would provide more combinations as a function of $2^{(\#of\ tracks)}$, and therefore, a greater accuracy. The number of tracks is a matter of design choice as a function of preferred accuracy. The Gray-scale optically sensed pattern is decoded into a combination of 2 out of 8 audible tones which frequencies are derived as a function of an oscillator frequency and the values listed in FIG. 11, 182, 183.

Figure 4A:
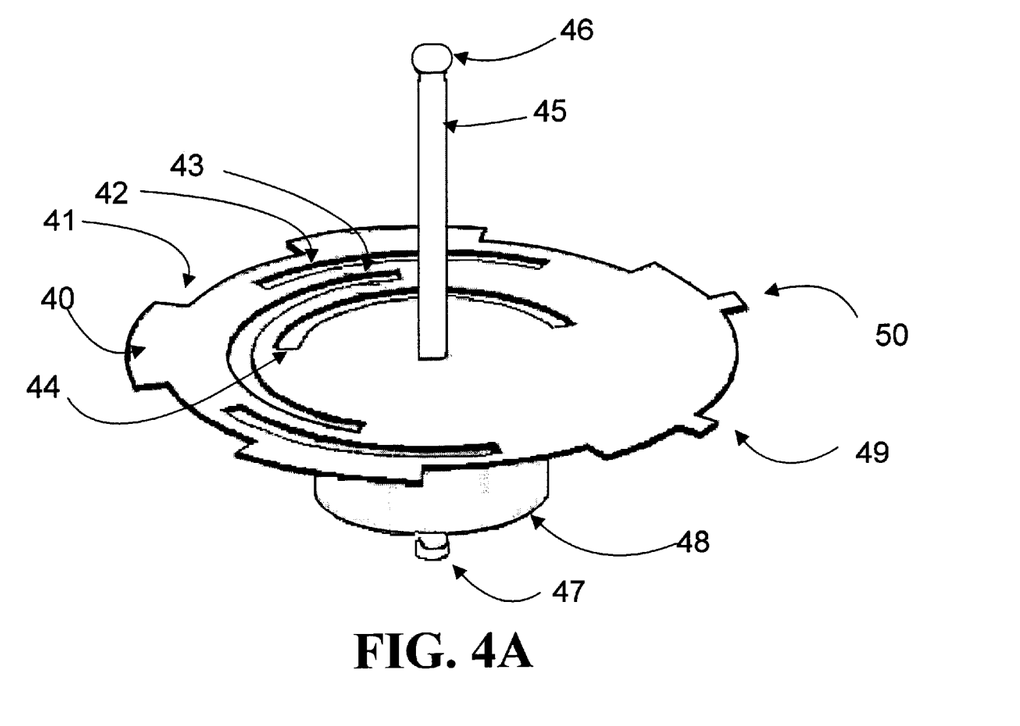
FIGS. 4A and 4B are a perspective view of the encoded disc with both binary representative cut-away sections and a pair of colored tracks for colorimetric sensing used in the sensor unit of the invention, as well as a plan view thereof.
Figure 4B:
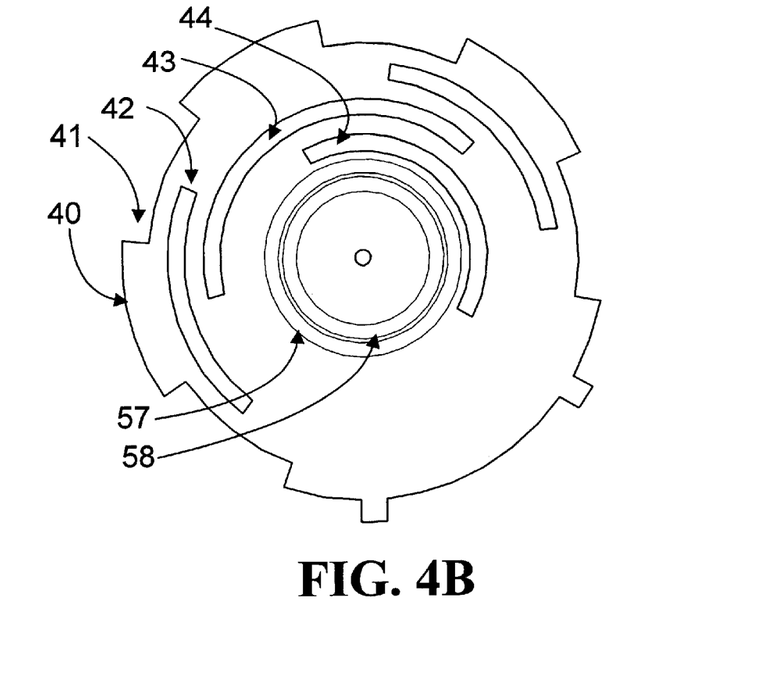

In addition to the above-noted binary decoded angular representation, greater accuracy can be provided utilizing additional concentric tracks with a colorimetric optically sensed pattern. The pattern preferably utilizes color tracks having variant concentric shading. The tracks may be located anywhere on the disc and, in the example shown in FIG. 4, are presented as a pair of inner concentric tracks. These patterns would provide a greater degree of accuracy, but often the color-sensing devices therefor are more expensive than the binary sensors noted above. The color-coded disc may have light-transmitting or light-reflecting colored information arranged in such a pattern that coded information can be electronically constructed by colorimetric means using an optical sensor or photosensor such as a photodiode, phototransistor, or photocell; and which resolution and accuracy of the positional information increases as a function of the resolution of the color-coded information.

Figure 11:
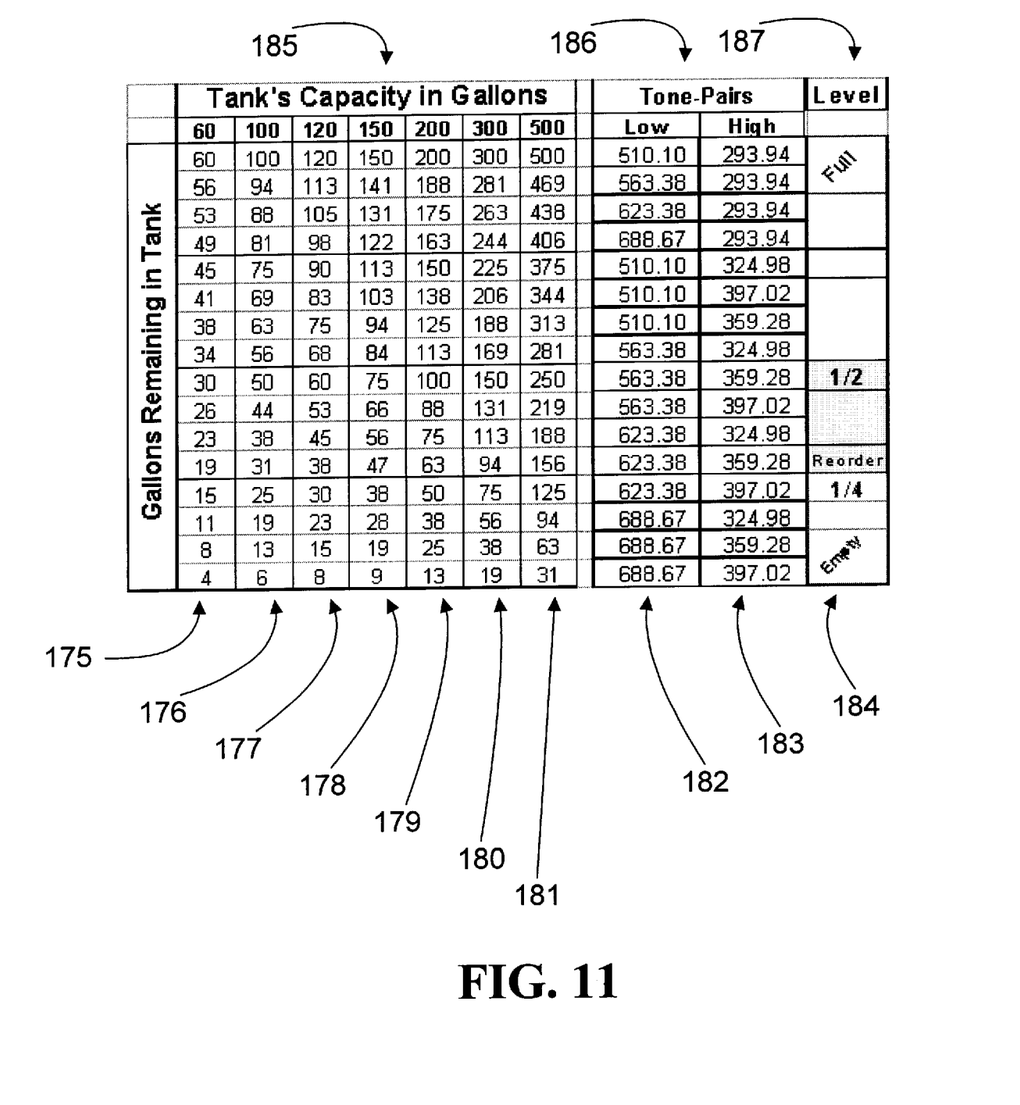
FIG. 11 is the a conversion table used in the invention to convert the tone-pairs generated by the sensor unit to gallons remaining in the tank.

The combination of oscillator frequency and the values listed in FIG. 11, 182, 183. represents the angular position of the color encoded disc. Audible tone function: OSC/Lval= LowFreq tone, OSC/Hval=HighFreq tone. Where OSC is the oscillator frequency driving the frequency generating circuitry and its value can be from 200 KHz to 950 KHz. Even more preferred, the electronic circuit can transmit this information to a receiving/sending unit, either by means of audible tones through a shielded conducting cable or by means of Amplitude Modulation Keyed (AMK) radio frequency waves. The disc can also include only the graduating-scale or colorimetric optically sensed patterns without the binary sensors.

Yet a further embodiment pertains to a method to convert the angular direction of the encoded disc into multi-frequency tones by means of binary coding or colorimetrically measuring the angular direction of an encoded disc by optically analyzing the binary coding and color shades on the disc. The derived level of propane inside the tank is thereby encrypted and transmitted to a receiving/sending unit by means of shielded electrical wires connecting the sensor and receiving/sending units, or by means of wireless radio frequency link between the sensor and receiving/sending unit in the unlicensed RF band by using Carrier-Absent-Carrier-Present RF modulation. This unit may be powered by a stored energy source such as a lithium battery that can last for over 10 years of operation.

The invention further includes various means to enclose the sensor unit of the invention. Preferably, the enclosure provides a recessed top into which the existing gauge being replaced can be sited, thus providing also a means for a visual, on-site indication for the level of liquid propane remaining in the tank. Alternatively, the enclosure does not provide for a visual, on-site indication of the level of liquid propane remaining in the tank.

In a preferred embodiment, the receiving/sending unit comprises a programmable microcontroller-based electronic device linked by RF or by shielded electrical conductors to the sensors. It is connected to the public telephone network in a similar fashion as a regular telephone is connected to the same network; powered from the telephone line while in the active mode and, during its sleep mode, by a lithium battery that can last for over 10 years of operation. This unit is capable of analyzing the information received from the sensor unit and, upon certain events or conditions being met, unobtrusively place a telephone call to a remote host system or to the propane dealer, transmitting the same information or derived data thereof. Preferably, the receiving/sending unit is capable of being reprogrammed remotely by the host system or remote system via a telephone line.

Yet another embodiment of the subject invention pertains to software programs running on a PC type computer, main frame, microcomputer, and the like acting as the host system, which enables the host system to receive, decode, store, interpret and analyze the information sent by the receiving/sending and produce the corresponding information to aid the propane dealer in scheduling and delivering the product.

A further embodiment is directed to a method to reprogram the devices of the subject invention in the field via a connection, such as the Internet, or other similar communication network, that allows the propane dealer to control, set or reset operating parameters and determine events upon which the device will activate, comprising signaling the host system, setting the triggering condition or event; imparting such reprogramming instructions to one or more devices selected based on certain condition(s).

The invention further includes a method to convert tone-pair signals to percentage of tank's volume filled with liquid propane (FIG. 11), a method to convert tone-pair signals to tank's level of liquid propane in fractional scale indication, and a method to determine that a particular device is inoperative comprising monitoring calls within a preset or prescheduled periodicity.

A specific aspect of the subject invention pertains to a Propane Tank Colorimetric Level Sensor comprising a hermetically sealed enclosure that can be mounted on top of existing float assemblies of propane tanks and heating oil tanks. This embodiment includes an electronic circuitry to provide a reference source of light in one or more wave lengths, projected onto an encoded disc; an encoded disc such as, but not limited to, a binary coded, a Gray-scale-coded or a color-coded disc (the encoded disc) affixed to a rotating magnet; the means to electronically receive and measure the difference between the various projected and reflected light wave lengths from the encoded disc; the means to convert the amount of light reflected from the encoded disc to frequency (light-to-frequency converter); the means to sense and convert the temperature of the sensor unit to frequency (temperature-to-frequency converter); the means to interconnect to the public telephone network by conventional and FCC approved methods; and the means to send/receive signals and information to/from the remote system.

OBJECTS AND ADVANTAGES OF THE PRESENT INVENTION

It is an object of the present invention to improve efficiency and cut costs associated with providing services that involve regular visits to measure and fill storage tanks. The invention allows the dealer to differentiate his service over the prospects current supplier. The dealer is able to offer an enhanced service by offering remote vigilance and fewer visits, all service calls scheduled with adequate notice for the customer and the dealer.

It is another object of the present invention to enable existing dealer outlets to extend their radius of coverage, gaining market share from adjacent markets, by avoiding any unnecessary trip to distant customers, thus turning what would have been a marginal customer to service, into a profitable one.

It is another object of the present invention to generate inventory information on a per-tank level. This information will increase the dealer's flexibility in timing bulk propane purchases; giving the power to time more efficiently their spot price, forward purchases and/or implement an even more precise hedging program with futures/options contracts, which then facilitates better distribution to branches in order to provide branch operators adequate inventories and to maintain profit margins during changing weather conditions.

One aspect of the invention pertains to an electronic device that replaces the existing gauge on the propane tank and when connected to the customer's existing telephone line, it can place a toll-free call to a host computer to report a low-gas situation. These calls are answered by a 24-hour automated system, then sorted and transmitted daily (or as the calls are received from the device) via electronic mail to their corresponding dealers, completely unattended. The invention operates unobtrusive of the homeowner, that is, it will not use the telephone line if it is being used, it will try to place a refill call later. This method of providing a low-gas warning allows the dealer ample time to schedule an effective route to dispense his product. The primary benefit for the dealer will be a substantial reduction to his operating costs, because the dealer will then have several days lead time to efficiently dispatch a driver to service only those tanks that called for a refill.

The invention alleviates the inefficient and costly industry practice in which drivers run routes checking more gauges rather than refilling customers tanks.

Further, because the invention can prevent "out of gas situations", it can be considered a safety device which reduces the hazards that may result when a customer has gas leaks after an out-of-gas situation.

Certain legal requirements may be imposed upon propane gas dealers which are met by the present invention. Liquified Petroleum Gas Laws, Rules and Regulations from every state virtually require the same vigilance from all licensed LP gas dealers. After an out-of-gas occurrence, all LP gas suppliers are required to perform physical inspections and leak checks of gas appliances and gas lines before and after refilling the containers. Further, insurance requirements impose additional obligations upon the LP dealers, making it mandatory that the dealer arrange to have physical access to their customers' premises in the presence of their customer while inspecting the lines and appliances after an out-of-gas occurrence. In addition, an inactive account for 12 months requires the dealer to initiate appropriate container abandonment procedures, and either remove the container, or perform pressure leak safety checks periodically. In the event the account is reactivated, the supplier must perform a pressure leak safety check prior to filling the container.

BRIEF DESCRIPTION OF THE DRAWINGS

For more complete understanding of the present invention and the advantages thereof, reference is now made to the following description taken in conjunction with the accompanying drawings in which.

DETAILED DISCLOSURE OF THE INVENTION

The subject invention is directed to a system, methods, and devices for monitoring a physical condition of, for example, levels in a tank.

One aspect of the subject invention pertains to a method comprising sensing a condition wherein a measurement signal is produced; processing said measurement signal; transmitting information from a remote site to a host system; and analyzing said information.

A specific aspect of the subject invention pertains to a method to measure, and an apparatus which optically senses and derives via binary, Gray-code, and/or colorimetric sensing the angular position of an encoded disc (binary coded, Gray-coded, and/or color coded) affixed to a rotating body such as, but not limited to, a magnet (the slave magnet) which is magnetically coupled to another magnet (the master magnet) located with the device, such as a tank, which, in turn, changes its angular orientation in direct relation to the condition or event being measured by other means. Such devices may include, but are not limited to an LP gas or heating-oil tank's float assembly (or, such as a device mounted on the hinge of a door) that changes the angular orientation of a master magnet in direct relationship to the level of fluid contained in a tank (or the angle at which the door is opened); therefore, magnetically inducing the slave magnet to rotate to the similar angular orientation, magnetically aligning the slave with the master magnet; thus producing information of the level of a liquid in a tank, or if a door is opened, closed, or how far it is opened.

It is contemplated by the scope of this invention that other mating/affinity relationships which couple the two objects (referred to herein as master and slave magnets) are, of course, included herein and the invention is not limited to magnetic coupling. Therefore, the "magnets" as referred to herein contemplate any material which may have an appropriate affinity for the other. Accordingly, for example, the master magnet may have a natural or induced magnetic field to attract either another magnet or an object made of iron or steel, and vice versa.

Figure 1A:
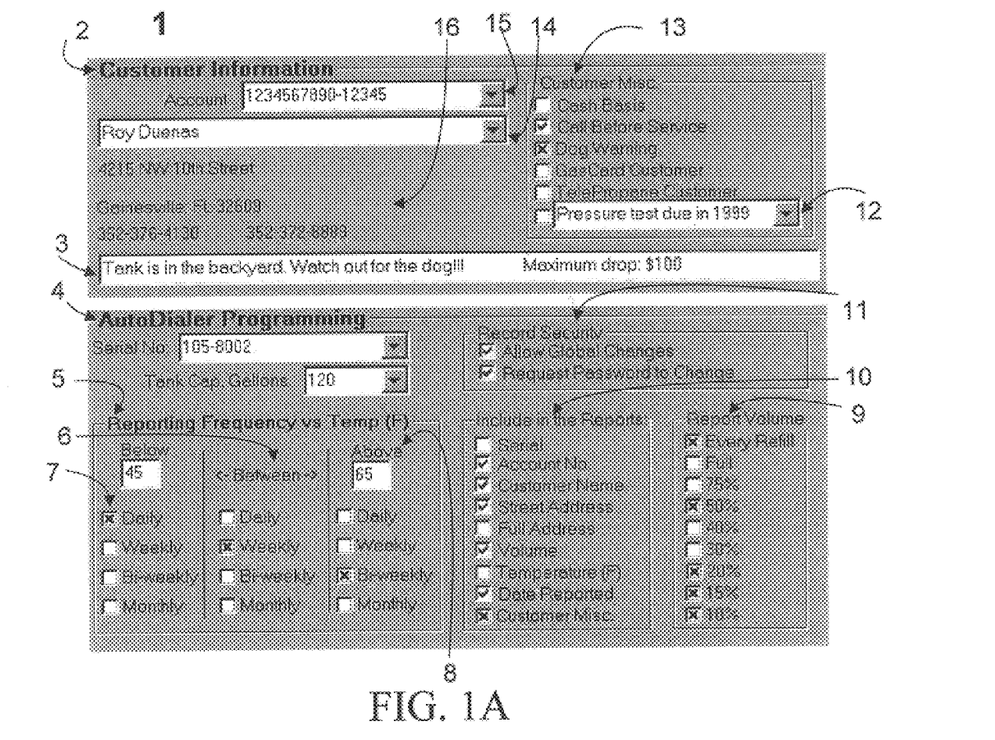
FIGS. 1A and 1B are a schematic view of a user interface screen for a global communication network such as the Internet through which the invention is remotely controlled and reprogrammed by the user, and the user interface screen's interaction with a plurality of residential, industrial, and commercial propane tanks, and the interaction with the propane dealer.
Figure 1B:
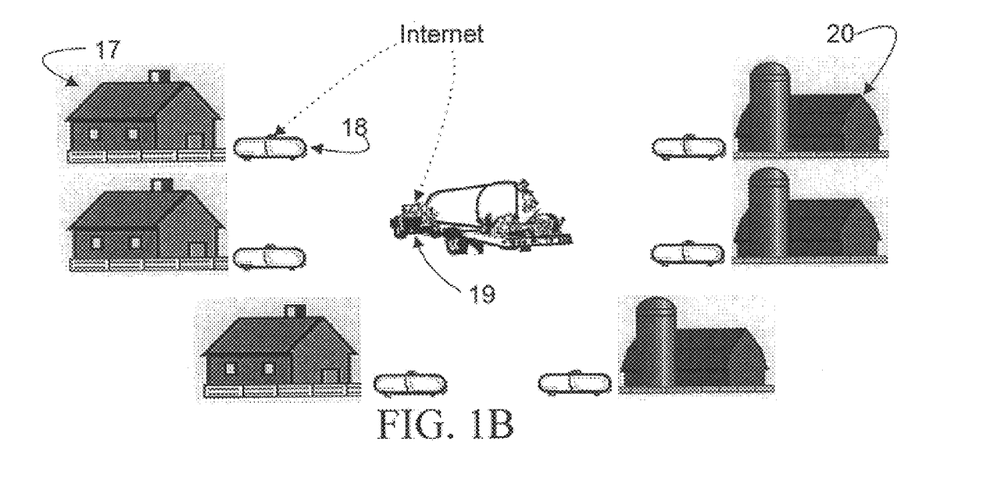
Figure 10:
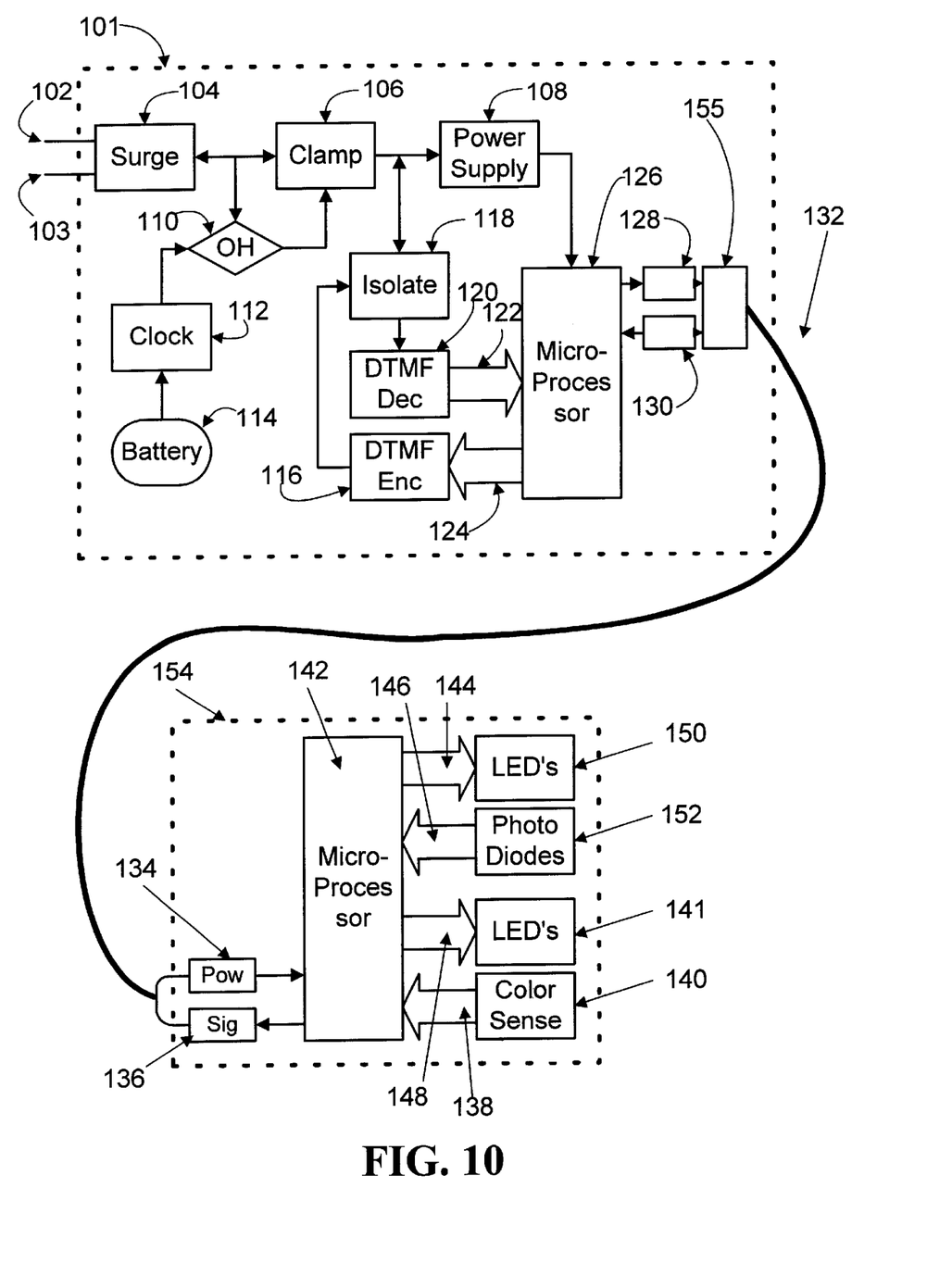
FIG. 10 is a block diagram of the sensor unit and the remote system unit of the invention.

A specific aspect of the invention is directed to a system for monitoring content level of a tank comprising a Host system (represented by the user screen interface 1 of FIG. 1), a remote system 101, and sensor units 154 (FIG. 10). The host system can be a device such as a PC type computer that, through one or more means of communication, sends/ receives information and instructions to/from one or more Remote systems. The Host system can communicate with the remote system by using one or more means such as, but not limited to, DTMF tones under an encrypted protocol through telephones lines, radio waves through the air and the like. It can store and consolidate all the information sent/ received to/from each remote system. It can also analyze and make predictive projections based on the information stored and consolidated; and take appropriate action such as, but not limited to, warning, prompting or instructing an operator or an automated system to take certain actions such as a service call, print reports, graphs, charts, invoices, send/ receive e-mails and the like.

Referring to FIG. 1 of the drawing, the numeral 1 generally designates a preferred communication network user interface screen through which the user, who may be an operator, or the propane dealer himself, can reprogram and control the system via the Internet, for example, or other communication means. The user interface screen 1 can be custom designed for a particular dealer's preference and current delivery system and policies. It can be interfaced to a customer database as is well known in the art. In the preferred embodiment shown in FIG. 1, the interface screen 1 allows the propane dealer to maintain his customer information 2, by entering or searching his customer's account number 15, the name of the customer 14, and/or the address and telephone numbers of the customer 16. A brief comment or warning field 3 may also be provided, as well a miscellaneous customer information 13 with a list of predefined comments 12. The setting and reprogramming of the remote system and of its sensor unit can be accessed through the programming module 4 of the screen 1, in which the propane dealer can set various parameters including the sensor unit's unique serial number, the tank's capacity in gallons, and program, for example, the desired Reporting Frequency vs. Temperature 5. In this field of the screen, the remote system can be programmed to call on a certain frequency 7 when the temperature falls bellow certain level, when the temperature range 6 is between the low range and the higher range 8, and to call at a different frequency when the temperature is above the level indicated 8. Record security 11 is provided to the dealer to protect each record by allowing individual records to be affected by global changes and to request a password in order to affect changes onto it. Certain reports 10 may be included by checking the appropriate list box as well as a list for report volume 9 as a measure of percentage. Variations of this user interface screen are contemplated by this invention and such is not limited by the specific example included herein.

FIG. 1 also includes the preferred flow of information for this system. The information from the propane tank 18 of a location 17, or 20 is sent via a telephone, Internet or otherwise (propane request from tank monitor) to Host system through the interface screen 1 in order to report the tank's level and request a refill if necessary. Information also flows from the Host system interface screen 1 via the Internet or other means of communication to the dealer 19 for a delivery order. Also, the propane delivery from the dealer 19 to the propane tank 18 is represented in this picture. Programming of the tank monitor may also be accomplished via the Internet/communication means.

Figure 2:
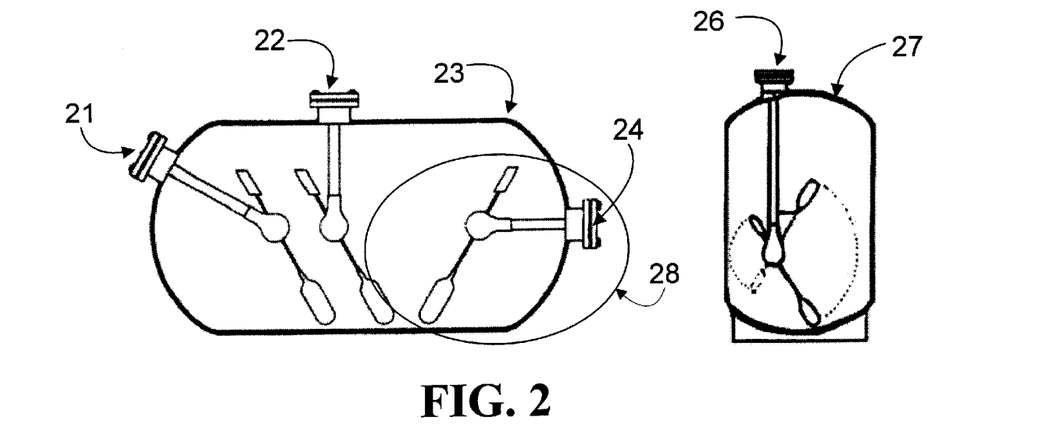
FIG. 2 is a schematic representation of horizontal and vertical propane tanks with the different orientations that the float assemblies may be attached to the tanks.
Figure 3:
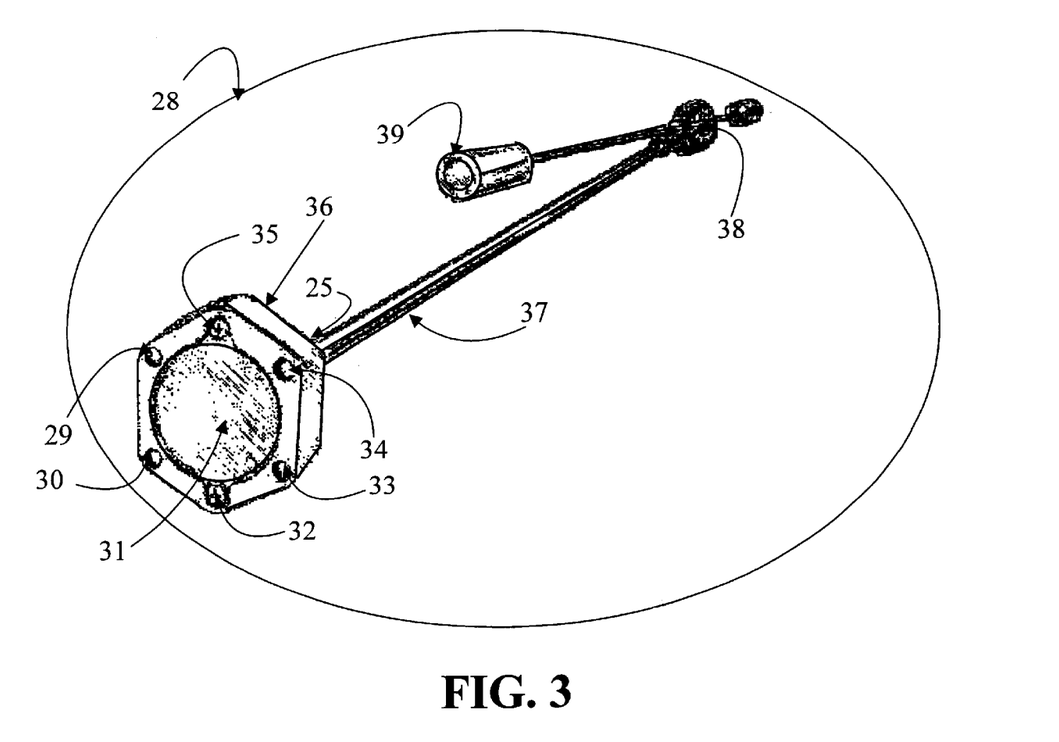
FIG. 3 is an enlarged view of 28 as shown in FIG. 2.

Referring to FIG. 2 and FIG. 3 of the drawings, horizontal 23 and vertical 27 propane tanks are generally represented with some possible positions for the float assembly 28 to be installed in propane tanks 23, 27; positions which may be vertical 26, 22, horizontal 24, or at an angle 21. The purpose of showing the various positions that a float assembly 28 can be installed on propane tanks is to reference the various angles at which the sensor unit of the invention can operate. The float assembly 28 represents the attachment mechanism through which the sensor unit of the invention detects the level of the propane inside the tanks. The float 39 floats at the level of the liquid propane inside the tank which vertical movement of the float following the level of the liquid is converted into rotational movement by a pinion 38 which rotates a shaft extending inside tube 37 and turns a master magnet 25 under the recess 31 where the housing to the sensor unit fits into. The float assembly 28 attaches by the float head 36 under a pressure seal held by bolts through holes 29, 30, 33, and 34; and the sensor unit attaches to the float head 36 with screws 32 and 35.

Turning now to FIG. 4 of the drawings, numeral 40 generally represents an encoded disc with either reflective or cut-outs of encoded tracks 41, 42, 43, 44 which are arranged in reference with each other so that the angular orientation of the disc 40 can be derived in a binary representation by looking at the number and position of the cut-outs or reflective track surfaces when viewing perpendicular to the disc plane in a direction parallel to the normal rotational axis of the disc. The light-conducting or light-reflecting information are arranged in a pattern of tracks and sectors in such a way that positional information of the rotating magnet can be electronically derived or calculated by means of one or more optical sensors such as photodiodes, phototransistors, or photocells. The example in FIG. 4 utilizes four tracks. Differing numbers of tracks are contemplated herein since the resolution and accuracy of the positional information increases as a function of the number of optical sensors and tracks used therein.

Color gradient bands are also imprinted onto the disc 57, 58. Representative colors may include red 57, and green 58 which vary in shading about the circumference in an opposing relationship for better reference.

The disc is suspended on an axle 45 which in turn rests on to bearings 46 and 47, with 47 preferably made of sapphire to minimize friction between the axle and the supporting surfaces. The encoded disc 40 is attached to the top surface of the slave magnet 48 which mates with the master magnet 25 of the float assembly 28. As the master magnet 25 rotates with the vertical movement of the float 39, the slave magnet 48, which is magnetically coupled thereto, rotates. The encoded tracks 41, 42, 43, 44, are encoded to preferably less than a complete 360° revolution which encoded circumference is limited by rotational stops 49, 50. The purpose of limiting the encoded circumference to be less than a full 360° of revolution is to increase the resolution at the low and high ends of the level of the propane tank.

Figure 5:
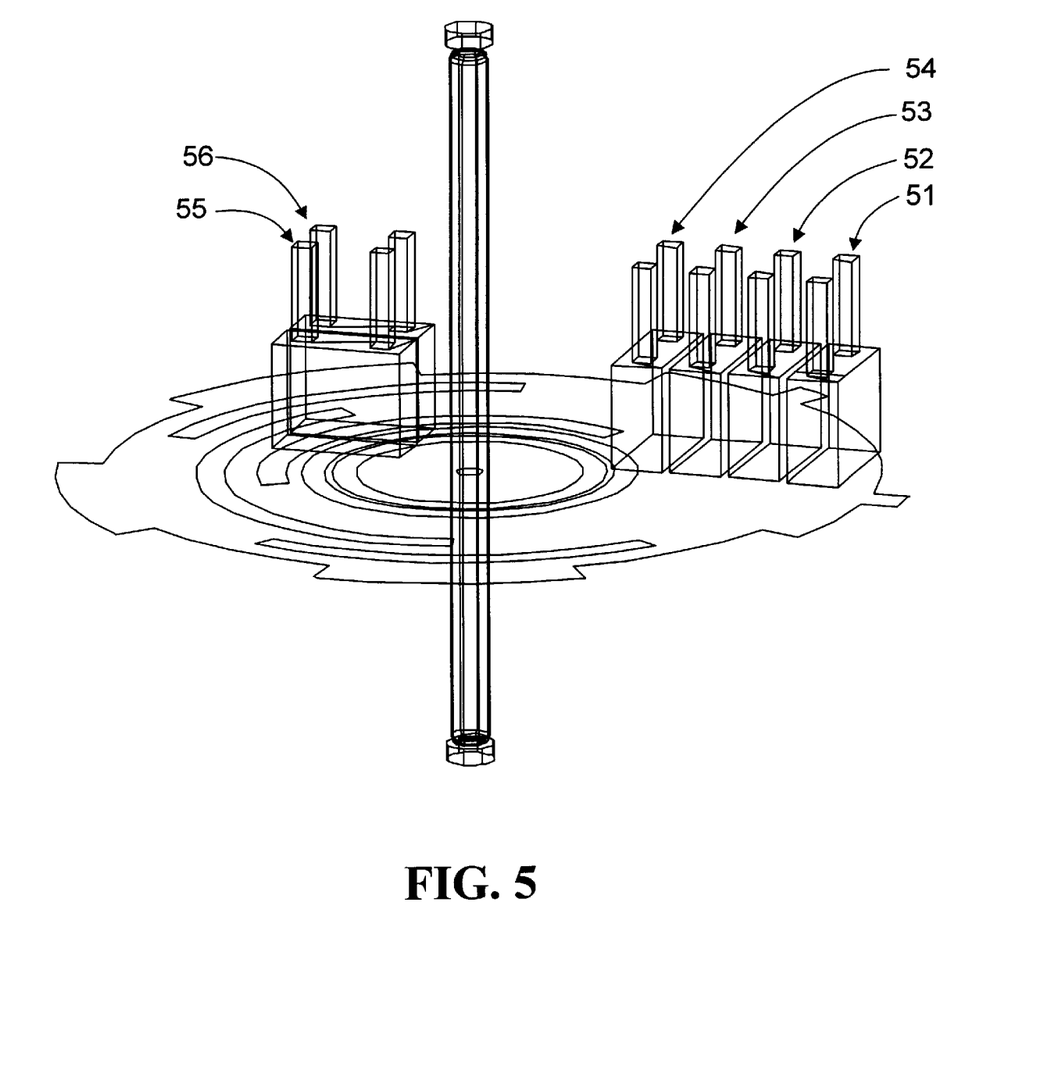
FIG. 5 is a perspective wire-frame view of the optical devices, light-emitting and light-receiving devices, and of the binary and colorimetric sensing devices placed above their respective coded tracks.

FIG. 5 of the drawings shows the encoded disc which is encoded both with the four "binary" tracks and a pair of colored tracks which vary in degree (shading) in opposing directions about the inner circumference. The placement of the tracks and number thereof may be varied according to design choice. The optical devices 51 through 56 read the encoded information off the disc 40 of FIG. 4. The optical devices preferably include a combination of colorimetric sensors for the color-coded tracks and reflective or cut-away photosensors for the binary-coded tracks, in the appropriate locations. A unit consisting of only sets of colorimetric, reflective, or cut-away sensors is also contemplated herein. The color shading in addition to the binary coding provides a more accurate reading to augment the binary reading of the binary-coded tracks. The colorimetric sensors 55 and 56 are situated above color gradient bands 57, 58 imprinted onto the disc. Representative colors may include red 57, and green 58 which vary in shading about the circumference in an opposing relationship for better reference. The reflective or cut-away photosensors 51, 52, 53, and 54 are respectively located to sense the reflective or cut-outs of binary encoded tracks 41, 42, 43, and 44, as shown in FIG. 4. In a reflective embodiment, the light source would reflect off the reflective sections of the surface of the encoded disc and the reflective photosensors would detect the appropriate information. In a cut-out embodiment, the light source would pass through the coded disc and the cut-away photosensors would detect the appropriate information. The positioning of the light source could be above or below the disc, as appropriate. Further, reflective under-surfacing could be placed below the cut-outs.

Figure 6:
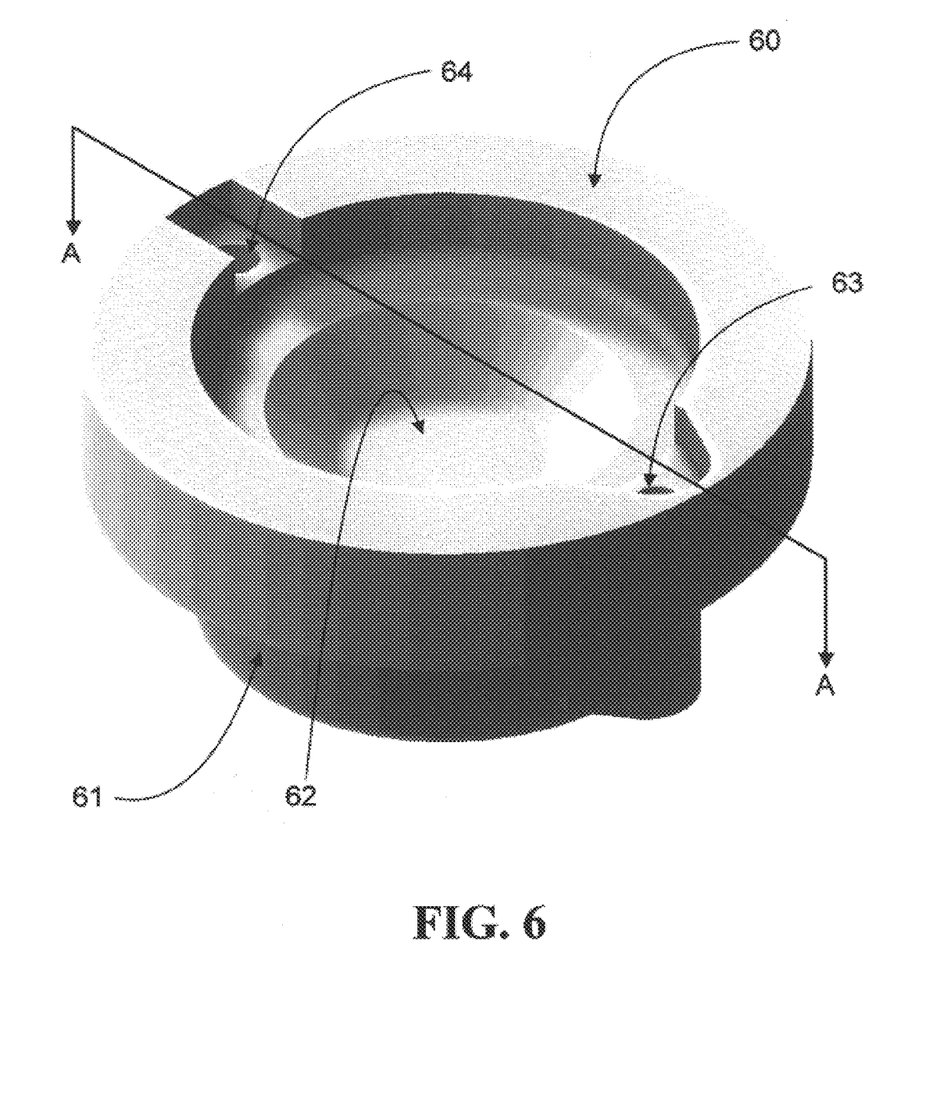
FIG. 6 is a perspective view of the preferred enclosure for the sensor unit of the invention. This enclosure provides a recess to place a visual indicator of the tanks level onto it.

FIG. 6 of the drawings generally represents the preferred enclosure for the sensor unit, providing a recessed area 62 to place and hold a visual level indicator. The enclosure is preferably manufactured from plastic or from a non-ferromagnetic material so as to not interfere with the magnets. The top assembly 60 and the bottom assembly 61 house the electronics and the slave magnet 48 of the sensor unit. The enclosure attaches to the float assembly 28 with appropriate fastening means such as screws 32 and 35, or the like, that pass through holes 64, and 63 respectively. Other fastening means, such as clips, snaps, buckles, or wing nuts are contemplated herein as known in the art.

Figure 7:
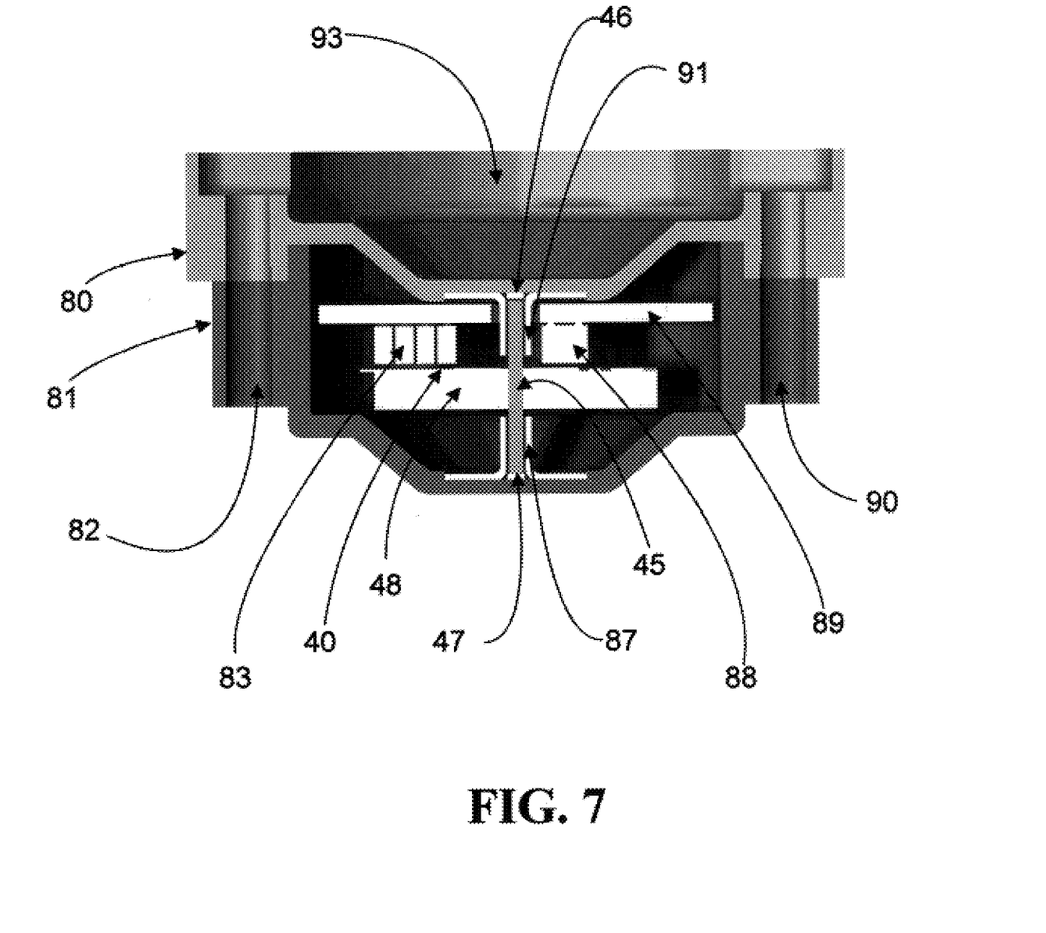
FIG. 7 is a cross-sectional view of the sensor unit of the invention depicting its major components and assemblies.

FIG. 7 of the drawings is a cross-section or cut-away view of section A—A of FIG. 6. This drawing shows how the top assembly 80 is attached to the bottom assembly 81. Numeral 83 represents the photosensors 51, 52, 53, 54 and numeral 88 represents the colorimetric devices 55, 56, attached to the printed circuit electronic board 89. The slave magnet 48 is attached to the shaft 45. The shaft 45 is suspended by the bottom bearing 47 and the top bearing 46. The shaft is held in position by the top shaft guide 91 and the bottom shaft guide 87. The encoded disc 40 is attached to the top surface of the magnet 48 thus providing readable information to the photosensor devices 51, 52, 53, 54 and to the colorimetric devices 55, 56, attached to the printed circuit electronic board 89. The top 80 and bottom 81 assemblies have holes 82, 90, through which screws 32, 35, pass through to attach the sensor unit to the float assembly 28 of FIG. 3.

Figure 8:
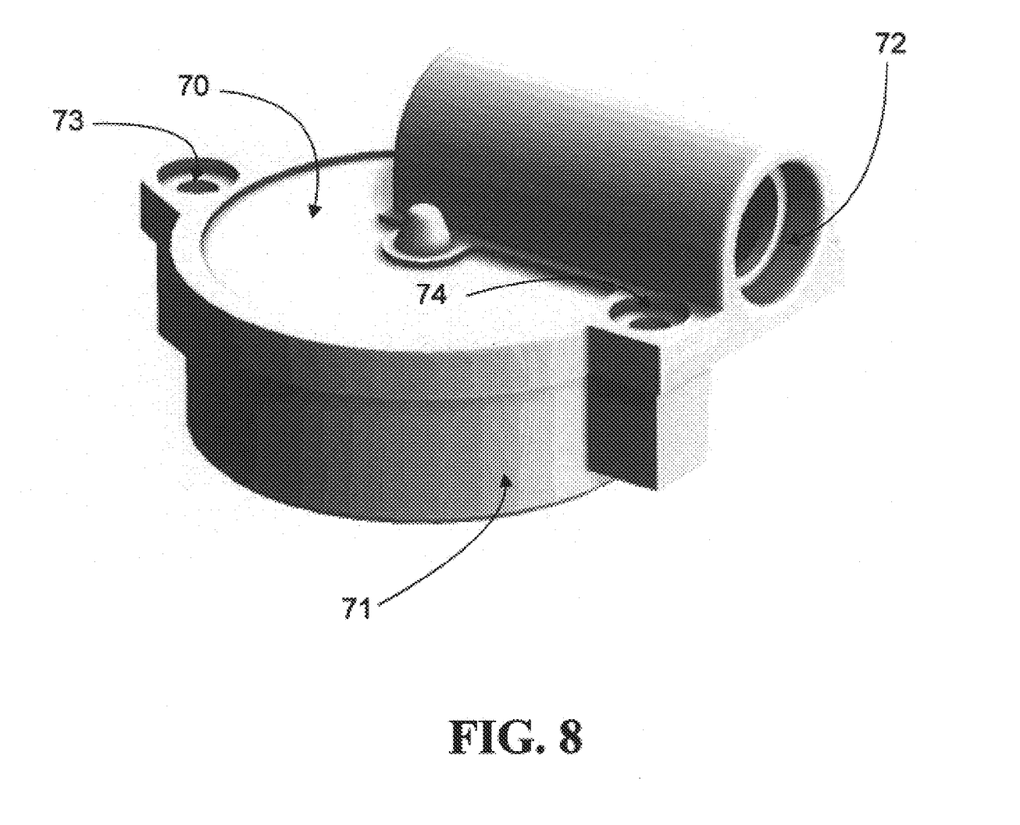
FIG. 8 is a perspective view of a variation of the preferred enclosure for the sensor unit of the invention, which does not provide a recess to place a visual indicator of the tanks level onto it.

FIG. 8 of the drawings generally represents the preferred enclosure 71 for the sensor unit 154, which does not provide a recessed area as in FIG. 6, 62 to place and hold a visual level indicator. The enclosure is preferably manufactured from plastic or from a nonferromagnetic material. The top assembly 70 and the bottom assembly 71 house the electronics and the slave magnet 48 comprising the sensor unit. The enclosure attaches to the float assembly 28, with screws 32, 35 that pass through holes 74, and 73 respectively. Numeral 72 indicates the porthole for the connector to run an electrical conductor from the sensor unit to the remote system.

Figure 9:
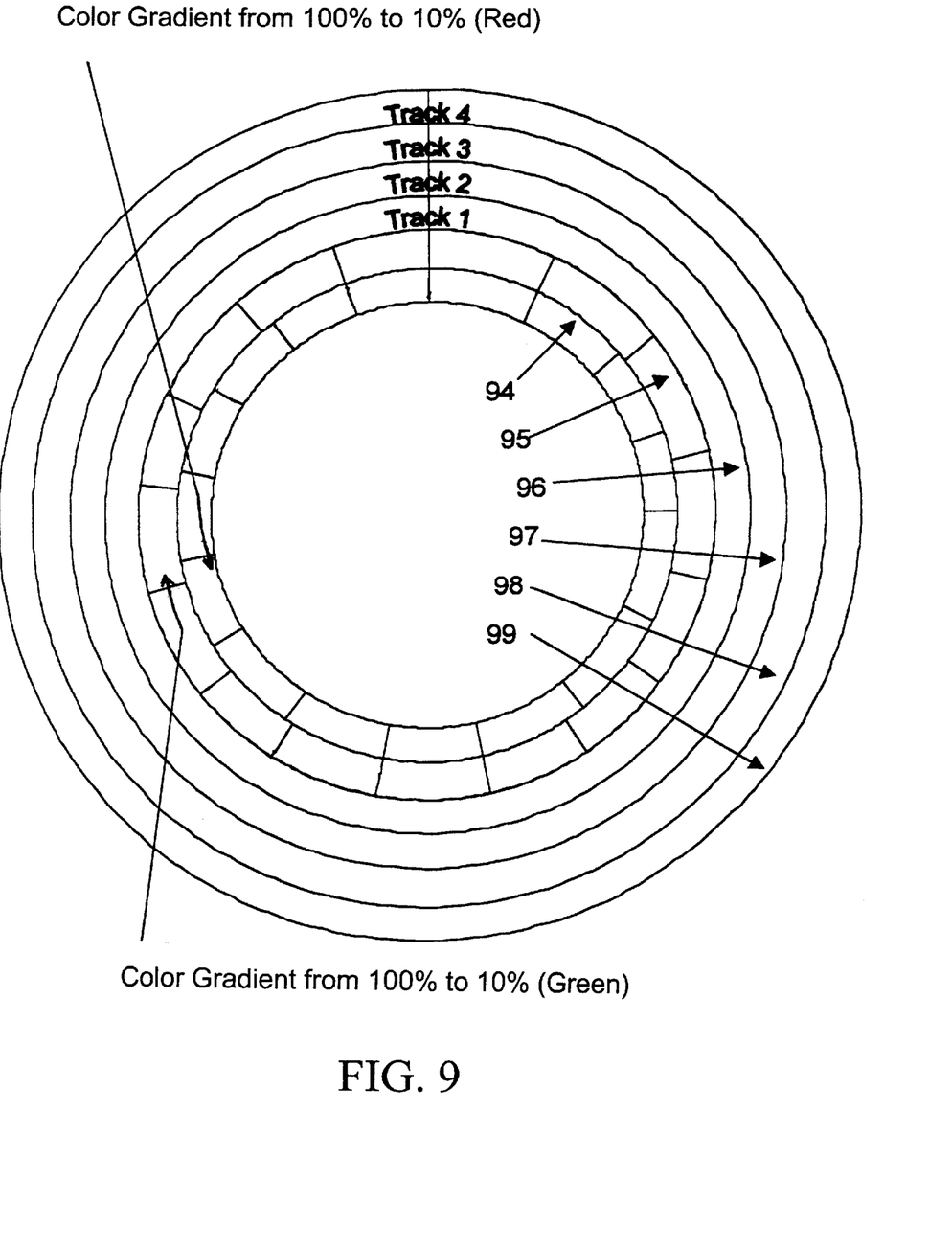
FIG. 9 is a circular schematic of the angular representation to produce a tonepair which represents the angular position of the coded disc showing the four binary coded tracks and a pair of color-coded tracks.

FIG. 9 of the drawings represents the preferred encoding layout of the disc 40 showing light-transmitting or light-reflecting binary and colored information arranged in such a pattern that coded information can be electronically constructed by colorimetric and binary means using optical sensor such as photodiodes, phototransistors, or photocells; and which resolution and accuracy of the positional information increases as a function of the resolution of the color-coded information. In a preferred arrangement, a set of colorimetric tracks 94, 95, in combination with binary-coded or Gray-coded tracks 96, 97, 98, 99 of the disc can be interpreted by colorimetric and binary sensing devices, respectively. The colorimetric devices electronically convert the color shade and color combination (e.g., red and green for contrast) thereof into a tone-pair corresponding to the angular position of the disc. The color track combination, in addition to the color shading or color value of the combined tracks will represent the actual angle of the disc and is converted by electronic means into levels of liquid in the tank. A single pair of color-coded tracks are represented herein, however, greater or fewer tracks depending on desired accuracy is contemplated. Other color combinations may also be used. Color-coding may include any form of gradient shading of any suitable color, including grey.

FIG. 10 of the drawings, numeral 101 represents a block diagram of the remote system unit. Numeral 154 represents a block diagram of the Sensor unit. The following is a brief summary of the remote system and some of its features. The remote system 101 preferably comprises a dedicated self-contained remotely programmable RISC-based microcomputer 126, which monitors and interprets events or signals received or sent from/to the various Sensor units 154 associated with it. The remote system 101 analyzes these events and signals through an embedded set of instructions; and, by selecting from one or more means of communications, determines how, when, and what to communicate to the host system. It can communicate with the host system by using one or more means such as, but not limited to, DTMF tones under an encrypted protocol through telephones lines, radio waves through the air, and the like. It can interconnect to the public telephone network by conventional, FCC approved means. The remote system 101 is designed to meet all applicable FCC regulations for telephone interconnect and all applicable FCC and regulatory requirements when other means of communicating with the host system are used. The remote system 101 preferably can reconfigure itself, supercede previous instructions, or store and consolidate the information or instructions received/sent from/to the host system or from/to one or more sensors associated with it. It can derive its power from one or more sources such as, but not limited to, an enclosed battery, telephone lines, cable TV grid, power grid, solar cells, etc. It provides signal and power that meet or exceed Underwriters Laboratories Standards for Intrinsically Safe devices to Sensors located in hazardous and explosive environments.

The sensor unit 154 will now be described along with some of its unique features. The sensor unit 154 includes various sensors and devices such as, but not limited to, an electrical switch, opto-electronic devices, acoustic sensors, radiation counters, light-to-frequency, light-to-voltage, light-to-current converters, hall-effect sensors, and the like, by means of digital signal or analog signals, or a combination thereof. One embodiment of the invention is directed to a sensor unit located and attached to an existing magnetic float assembly of propane tanks, which derives the level of liquid propane in a tank by magnetically coupling a rotating binary-coded, Gray-coded and/or color-coded encoded disc to the magnet contained within the existing float assembly used in propane tanks. Preferably, the sensor unit comprises a flat-disc bearing system made of low coefficient of friction material like sapphire, ruby, or ceramic which supports the shaft on which the encoded disc rotates along with the mounted magnet by means of the magnetic force exercised by the magnet contained within the existing float assembly used in propane tanks. The rotating binary-coded, Gray-coded and/or color-coded encoded disc can be coupled to the tank by other known means, not necessarily utilizing magnets. Provided the encoded disc rotates to correspond with the liquid level in the tank, by any means, the remote unit will appropriately obtain information regarding liquid levels.

The sensor unit 154 preferably includes a coded disc 40 having light-conducting or light-reflecting information arranged in a pattern of tracks (binary-coded) and sectors in such a way that positional information of the rotating magnet can be electronically derived or calculated by means of one or more optical sensors such as photodiodes, phototransistors, or photocells; and which the resolution and accuracy of the positional information increases as a function of the number of optical sensors used therein.

Alternatively, or in combination with the binary-coded tracks, the sensor unit 154 includes a color-coded disc having light-transmitting or light-reflecting colored information arranged in such a pattern that coded information can be electronically constructed by colorimetric means using optical sensor such as photodiodes, phototransistors, or photocells; and which resolution and accuracy of the positional information increases as a function of the resolution of the color-coded information.

The remote system 101 is comprised of an internal battery/power supply 114 which continuously powers an internal clock 112. Surge protection 104 may be provided. The clock 112 periodically provides an interrupt signal on one of its output pins which brings the pin's voltage from ground (0 volts) to the battery voltage (Vcc), for approximately 1/1000 of a second. This signal is used to wake the On-Hook Detector 110 circuit up on a periodical basis by activating the On-Hook Detector 110 circuit. The On-Hook Detector 110 circuit upon sensing a voltage across the Tip 102 and Ring 103 conductors above certain level, like 15 volts, activates the Clamping Circuit 106, which, at this time, the On-Hook Detector 110 circuit drops off line while the Clamping Circuit 106 holds low impedance load across the Tip 102 and Ring 103 conductors to procure a dial tone from the telephone company and introduces the Federal Communications Commission required 2 second delay before further action is taken. The Clamping Circuit 106 is now providing the remote system 101 with a means to derive its power directly off the telephone lines through the Power Supply 108 which provides now a regulated voltage to the microprocessor 126.

Upon the microprocessor 126 being powered, a program residing in its own memory is run and actions are taken based on certain parameters, events, and conditions set through the Internet user interface screen 1 of FIG. 1. Upon power up, the microprocessor 126 may execute various functions, one of which is to energize the sensor unit 154 by powering the Power 128 connector that feeds electrical current to the sensor unit 154 through a typical Intrinsically Safe Circuit 155 and a connecting electrical conductor 132 which carries both power 134 and signal 136 at the same time. Upon the microprocessor 126 powering the Sensor unit 154, it will sense and measure the signal sent from the sensor unit 154 through the Signal interface 130 and by running an internal software program, derive the angle at which the encoded disc 40 of FIG. 4 is positioned, thus deriving the level of the liquid propane remaining in the tank by the use of information provided by internally stored conversion tables such as that shown in FIG. 11.

Having determined the level of the remaining propane in the tank, the microprocessor 126 turns off power to the sensor unit 154 and proceeds to place a telephone call by dialing on the now readied telephone line with dial tone the host system's telephone number. Upon connecting to the host system, the remote system 101 will output its unique ID number, the tank's level and any other data using a combination of the Tone-Pairs listed on FIG. 11 indicated by numeral 186, representing such information in numerical format, and transmitted to the host system by the DTMF encoder 116 circuit. In addition, the remote system 101 has the capability to interpret any signals sent from the host system to the remote system 101 through the DTMF decoder 120 circuit. Data paths between the DTMF decoder, microprocessor, and DTMF encoder are represented by numerals 122 and 124, respectively. The remote system 101 unit contains an Isolation Circuit 118 which electrically isolates the direct current used for powering the devices and the signal injected by the systems that carry the information in tone-pair formats.

The sensor unit 154 (FIG. 10) is preferably comprised of a microprocessor 142 which upon being energized by the remote system 101, turns on the photosensor devices (e.g., LED's and photodiodes) 150,152, as shown in FIG. 5 as numerals 51, 52, 53, 54 which read the position of the disc 40 through the reflection or absence of reflected light from tracks 41, 42, 43, 44 of FIG. 4; and converts this information into a binary format which is converted into a tone-pair and transmitted through the connecting cable 132 to the remote system 101. Data paths to the LED's and from the photodiodes are represented by numerals 144 and 146 respectively. Upon reading the position of the disc 40, the microprocessor 142 turns off the photosensor devices 150, 152 (numerals 51, 52, 53, 54 of FIG. 5) and turns on the red colorimetric sensing device 55 through circuit 140 which reads the color intensity and shade of the red color band 57 imprinted onto the encoded disc 40; then turns it off and immediately turns on the green colorimetric sensing device 56 through circuit 140 which reads the color intensity and shade of the green color band 58 imprinted onto the encoded disc 40. This information is provided to the microprocessor through data path 138. The LED's are controlled through data path 148. Both signals are converted into their equivalent tone-pair set and transmitted through the connecting cable 132 to the remote system 101.

FIG. 11 of the drawings represents the conversion table used by the host system to decode the Tone-Pairs 186 which frequencies are derived from the initial values as listed under the Low 182 tone and the High 183 tone; transmitted by the remote system 101 to the host system. The Tone-Pairs corresponding to the level of remaining liquid propane in any given tank can be equated to indicated Level 184, 187, or by the quantity in number of gallons calculated based on the tank's capacity entered in the Tank's Capacity field indicated under FIG. 1, 4, which can be electronically converted to number of gallons remaining in the tank by the host system based on the table indicated by numeral 185, under the corresponding column enumerated by 175, 176, 177, 178, 179, 180, 181 for tank capacities of 60, 100, 120, 150, 200, 300, and 500 gallons, respectively.

Figure 12:
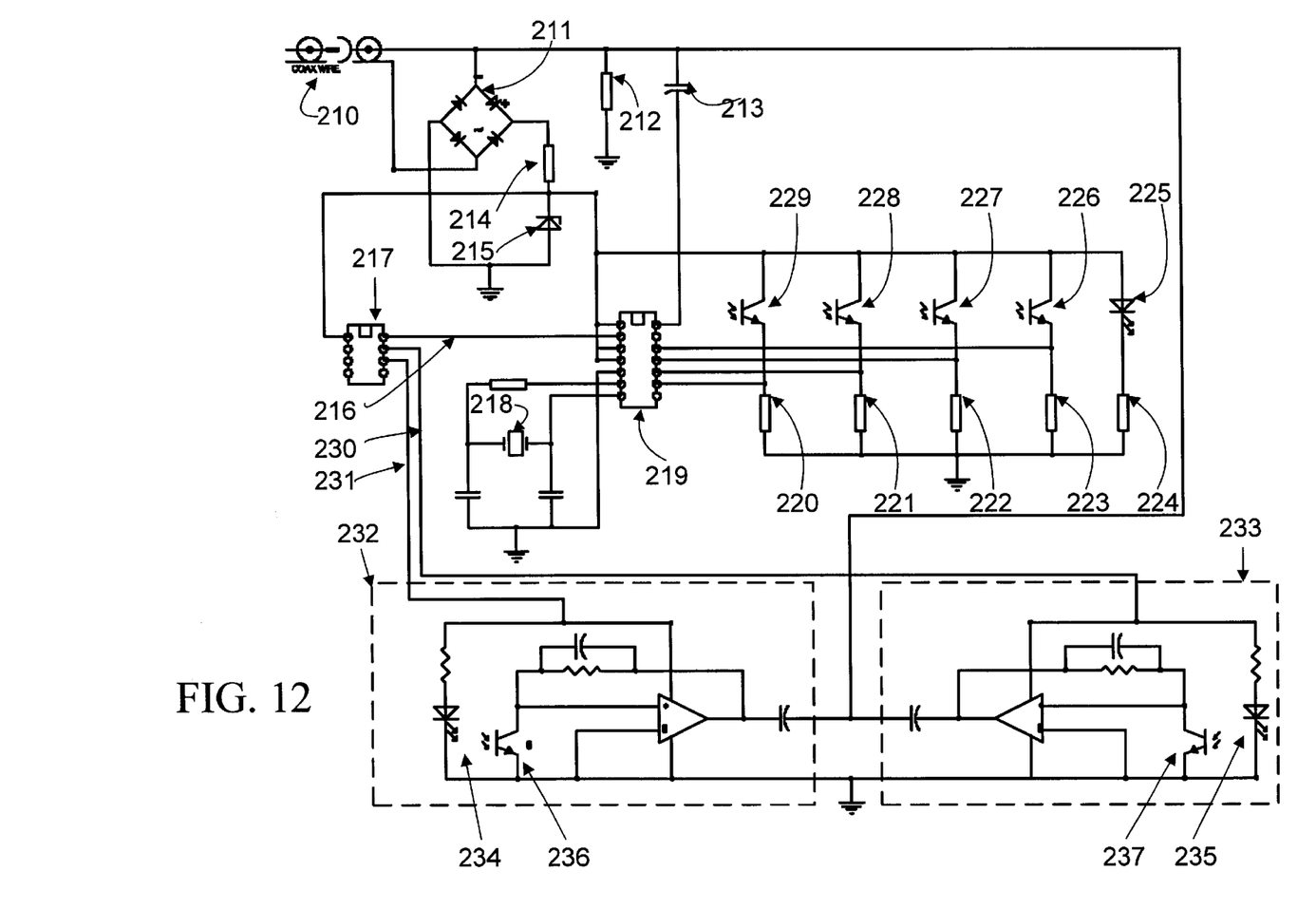
FIG. 12 is a circuit diagram of the sensor unit.

FIG. 12 of the drawings represents an electronic schematic of the sensor unit which is comprised of a connector like a coaxial conductor 210 to plug in the connecting cable 132 to the remote system 101. A rectifier bridge 211 to insure that whatever the polarity of the current powering the sensor unit is converted to the proper one. Load resistor 214 and limiting Zener diode 215 produce a limiting effect on the voltage level maintaining it below a certain level, like 5 volts. Resistor 212 serves as the matching impedance load viewed by the remote system power supply. Capacitor 213 serves as a signal isolator to inject the Tone-Pair signal into the same conductor powering the sensor unit. Stepping switch 217 provides power in alternating steps for a brief period, like 250/1000 of a second to a DTMF encoder processor circuit 219 through line 216; the DTMF encoder processor circuit 219 turns the light emitting device 225 which emits light onto or through the tracks indicated by numerals FIG. 4, 41, 42, 43, and 44; and photosensors 226, 227, 228, and 229 receive and binarilly encode the presence or absence of such light, so that the DTMF encoder processor circuit 219 can produce and inject through capacitor 213 a Tone-Pair signal corresponding to the combination of light signal received by each corresponding photosensor. Then for another brief period, it powers through line 230 the red colorimetric circuit 232 at which time the light source 234 turns on and the color sensing device 236 reads the shade and color of the red band FIG. 5, 57, the colorimetric circuit 232 outputs a signal which frequency is directly related to the sensed shade and color, into the same conductor powering the sensor unit. Once more, for another brief period, it powers through line 231 the green colorimetric circuit 233 at which time the light source 235 turns on and the color sensing device 237 reads the shade and color of the green band FIG. 5, 58, the colorimetric circuit 233 outputs a signal which frequency is directly related to the sensed shade and color, into the same conductor powering the sensor unit.

It should be readily apparent that the host system referred herein is capable of receiving calls originating from a plurality of remote system units and handling all the information; and firther communicating from and to these remote system units any and all pertinent signals and data in order to reprogram, control, or diagnose the integrity of the entire system or the remote units, as set forth by the propane dealer through the Internet User Interface Screen as described in FIG. 1, 1. Furthermore, the hardware and software described may be modified without departing from the spirit and scope of the appended claims.

What is claimed is:

1. A system for monitoring the content level of a tank, said system comprising a host system and a remotely located system wherein:

a) said host system and said remotely located system are capable of direct or indirect communication with each other; and b) a sensor unit associated with said remotely located system comprising an encoded disc, wherein said encoded disc rotates as a function of the content level of said tank; at least one light source, wherein light is projected onto or passed through said encoded disc; and at least one optical sensor, wherein said optical sensor receives light reflected off of or passed through said encoded disc and converts the light into a signal representative of content level, wherein said encoded disc comprises at least one color-coded track radially distributed about said disc to be read by said optical sensor.

2. The system of claim 1, wherein said optical sensor is a colorimetric sensor.

3. A sensor unit for measuring the content level of a tank comprising an encoded disc, wherein said encoded disc rotates as a function of the content level of said tank; at least one light source, wherein light is projected onto or passed through said encoded disc; and at least one optical sensor, wherein said optical sensor receives light reflected off of or passed through said encoded disc and converts the light into a signal, wherein said encoded disc comprises at least one color-coded track radially distributed about said disc to be read by said optical sensors.

4. A sensor unit for measuring the content level of a tank comprising an encoded disc, wherein said encoded disc rotates as a function of the content level of said tank; at least one light source, wherein light is projected onto or passed through said encoded disc; and at least one optical sensor, wherein said optical sensor receives light reflected off of or passed through said encoded disc and converts the light into a signal, and wherein said encoded disc comprises at least one binary-coded track radially distributed about said disc to be read by said optical sensors, and wherein said encoded disc further comprises at least one color-coded track radially distributed about said disc to be read by said optical sensors.

5. The sensor unit of claim 4, wherein said color-coded tracks are designed with a gradient shading to represent angular orientation of said disc.

6. A method for remotely monitoring the content level of a tank comprising sensing the content level of said tank with the sensor unit of claim 3.

7. The method of claim 6, wherein said encoded disc further comprises at least one color-coded track radially distributed about said disc to be read by said optical sensors.

8. The method of claim 6, wherein said color-coded tracks are designed with a gradient shading to represent angular orientation of said disc.

* * * * *